(12) United States Patent
Aoyagi et al.

(10) Patent No.: US 7,917,239 B2
(45) Date of Patent: Mar. 29, 2011

(54) INFORMATION PROCESSING APPARATUS AND SOUND OUTPUT METHOD

(75) Inventors: Tatsuya Aoyagi, Tachikawa (JP); Koichiro Takeguchi, Hachioji (JP)

(73) Assignee: Toshiba Corporation, Tokyo (JP)

( * ) Notice: Subject to any disclaimer, the term of this patent is extended or adjusted under 35 U.S.C. 154(b) by 1027 days.

(21) Appl. No.: 11/732,893

(22) Filed: Apr. 5, 2007

(65) Prior Publication Data

US 2007/0239296 A1      Oct. 11, 2007

(30) Foreign Application Priority Data

Apr. 7, 2006 (JP) ................. 2006-106510

(51) Int. Cl.
*G06F 17/00* (2006.01)
(52) U.S. Cl. ......................................... 700/94
(58) Field of Classification Search ............ 700/94; 713/2, 100; 710/14
See application file for complete search history.

(56) References Cited

U.S. PATENT DOCUMENTS

| | | | | |
|---|---|---|---|---|
| 6,654,827 B2 * | 11/2003 | Zhang et al. | ..................... | 710/62 |
| 6,711,631 B1 * | 3/2004 | Chan et al. | ..................... | 710/14 |
| 6,763,400 B2 | 7/2004 | Numano et al. | | |
| 6,763,458 B1 * | 7/2004 | Watanabe et al. | ............. | 713/100 |
| 7,243,168 B2 * | 7/2007 | Chan et al. | ..................... | 710/14 |
| 7,522,966 B2 * | 4/2009 | Du et al. | ..................... | 700/94 |
| 2002/0085835 A1 * | 7/2002 | Zhang et al. | ............. | 386/124 |

FOREIGN PATENT DOCUMENTS

| | | |
|---|---|---|
| JP | 8-228231 | 9/1996 |
| JP | H08-228231 A | 9/1996 |
| JP | 2002-091634 A | 3/2002 |
| JP | 2002 163060 | 6/2002 |
| JP | 2002-163060 A | 6/2002 |
| JP | 2004 264588 | 9/2004 |
| JP | 2004-264588 A | 9/2004 |
| JP | 2004-334877 A | 11/2004 |

OTHER PUBLICATIONS

English Translation of Japanese Office Action dated Apr. 15, 2008.

* cited by examiner

*Primary Examiner* — Andrew C Flanders
(74) *Attorney, Agent, or Firm* — Knobbe, Martens, Olson and Bear, LLP (57) ABSTRACT

According to one embodiment, an information processing apparatus includes an amplifier provided in a body and amplifying a sound signal to output sound from a speaker, a first system including a storage storing a first sound data and a sound device which generates an analog sound signal from the first sound data and supplies the generated sound signal to the amplifier, and further, outputting sound using the first sound data when the body is in a power-on state, and the second system configured to operate independently from the first system, and including a semiconductor memory storing a non-compression format second sound data and a digital-to-analog converter, which converts the second sound data into an analog sound signal and supplies the converted analog sound signal into the amplifier, and further, outputting sound using the second sound data when the body is in a power-off state.

9 Claims, 4 Drawing Sheets

| Volume setup (power-on state) | Volume information (power-off state) |
|---|---|
| 0 (Mute) | Mute |
| 1 - 85 | Small volume |
| 86 - 170 | Medium volume |
| 171 - 255 | Large volume |

FIG. 8

INFORMATION PROCESSING APPARATUS AND SOUND OUTPUT METHOD

CROSS-REFERENCE TO RELATED APPLICATIONS

This application is based upon and claims the benefit of priority from Japanese Patent Application No. 2006-106510, filed Apr. 7, 2006, the entire contents of which are incorporated herein by reference.

BACKGROUND

1. Field

One embodiment of the invention relates to an information processing apparatus such as a personal computer. In particular, the present invention relates to an information processing apparatus including two independently operating systems, and to a sound output method used for the same apparatus.

2. Description of the Related Art

When a computer is powered on, a CPU executes an operating system or application loaded to a memory so that various processes are executed. The following computer has been proposed (see Jpn. Pat. Appln. KOKAI Publication No. 2002-91634). The computer includes a subsystem operating independently from a main system such as the operating system even if it is not in a power-on state.

According to the technique disclosed in the foregoing Publication No. 2002-91634, encoded sound such as mp3 stored in an optical disk or hard disk drive is output. In this case, the encoded sound is output regardless of operating/non-operating state of the system such as the operating system.

Recently, it is desirable that an advanced computer has the following new function. Specifically, a mail information receive function operating via the foregoing subsystem is newly provided. When receiving a new mail, the computer outputs sound via a speaker to notify the arrival of the mail to user.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus comprises a body, an amplifier provided in the body, and amplifying a sound signal to output sound from a speaker, a first system provided in the body, the first system including a storage storing a first sound data and a sound device which generates an analog sound signal from the first sound data and supplies the generated sound signal to the amplifier, and configured to operate under the control of an operating system, and further, outputting sound using the first sound data when the body is in a power-on state, and a second system provided in the body, the second system configured to operate independently from the first system, and including a semiconductor memory storing a non-compression format second sound data and a digital-to-analog converter, which converts the second sound data into an analog sound signal and supplies the converted analog sound signal into the amplifier, and further, outputting sound using the second sound data when the body is in a power-off state.

Figure 1:
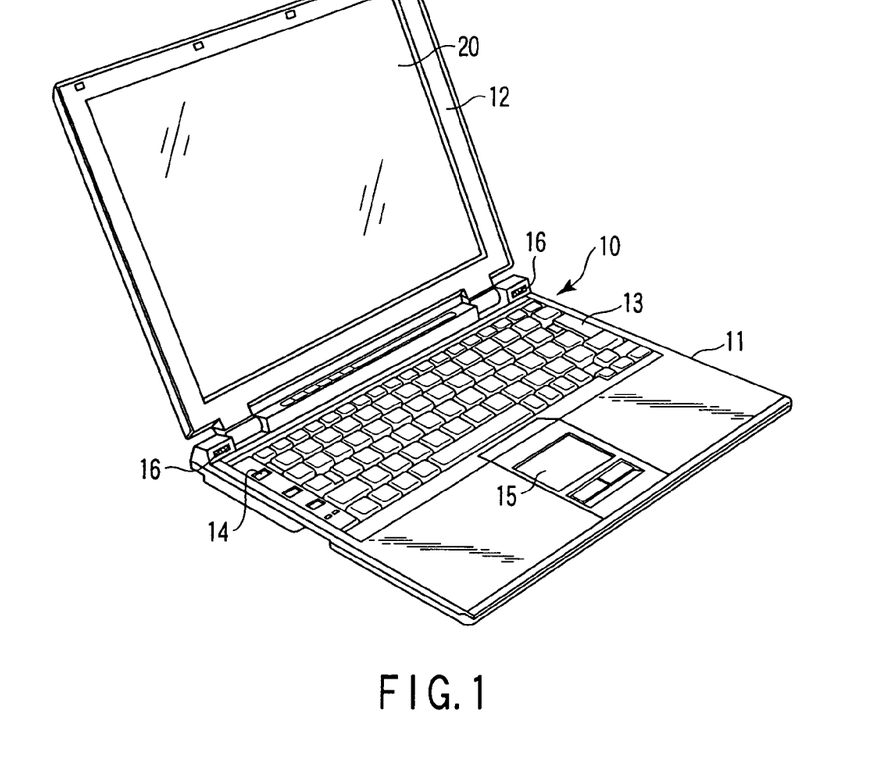
FIG. 1 is an exemplary perspective view showing the appearance of an information processing apparatus according to one embodiment of the present invention when viewed it from the front side.
Figure 2:
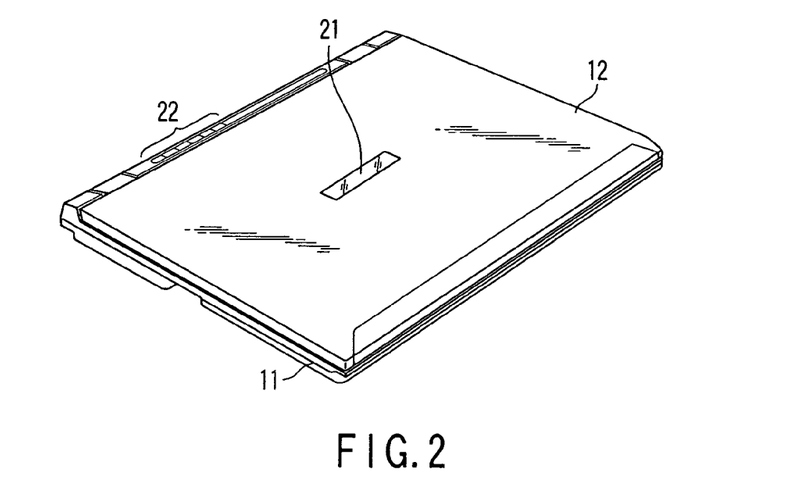
FIG. 2 is an exemplary perspective view showing the appearance of the information processing apparatus of FIG. 1 in a state that a display unit is closed.

Referring now to FIG. 1 and FIG. 2, the structure of an information processing apparatus according to one embodiment of the present invention will be described. The information processing apparatus is realized as a notebook battery-powered portable (mobile) computer 10. The computer 10 has the following function. According to the function, the computer 10 automatically executes communications receiving header information such as an electronic mail (e-mail) while maintaining a power-off state. Then, the computer 10 saves the received header information while notifying a newly received e-mail to user. The foregoing function calls a notification function.

Moreover, the information processing apparatus has the following function. According to the function, user sets up his schedule while keeping the computer 10 in a power-off state, and notification is given to user when the schedule setup time comes. The foregoing function calls an alarm function.

FIG. 1 is a perspective view showing the computer 10 in a state that a display unit is opened when viewed it from the front side.

The body of the computer 10 is composed of base unit 11 and display unit 12. The display unit 12 has a built-in display device comprising a liquid crystal display (LCD) 20. The display screen of the LCD 20 is positioned at the approximately center of the display unit 12.

The display unit 12 is supported to the base unit 11. The display unit 12 is attached so that it is freely rotatable between two positions with respect to the base unit 11. One is an open position such that the upper surface of the base unit 11 is exposed. Another is a closed position such that the upper surface of the base unit 11 is covered. The base unit 11 has a thin box body, and the upper surface is provided with keyboard 13, power button 14, touch pad 15 and right and left speakers 16. The power button 14 turns on and off the power of the computer 10. The base unit 11 further has a built-in wireless communication device. According to the foregoing notification function, wireless communications with outside devices such as mail server and other computer are made using the wireless communication device.

FIG. 2 is a perspective view showing the appearance of the computer 10 in a state that the display unit 12 is closed. The back side of the display unit 12 is provided with a sub-display 21. The sub-display 21 is a display device used for indicating various status information relevant to notification function and alarm function. For example, the sub-display 21 indicates the following information. One is information showing the field strength level of a wireless signal from a base station. Another is notification information for giving information that new data such as e-mail is received to user. Another is alarm information for notifying subject (title) and place set by user to user when the setup time comes. Of course, the received data itself may be displayed as notification information. For example, the sub-display 21 can display information (subject, sender name, date, etc.) included in the header of the received e-mail as notification information.

The sub-display 21 gives the following advantage to user even if the computer 10 is in a power-off state under the condition that the display unit 12 is closed. Namely, user can confirm that a new e-mail is received, and further, see the content of the newly received e-mail.

The rear side of the base unit is provided with an operation switch 22. The operation switch 22 includes some push button groups used for controlling the indication content of the sub-display 21. The push button group includes a button switch for designating screen up-scroll and a button switch for designating screen down-scroll. Even if the display unit 12 is in a closed state, the operation switch 22 is exposed outside.

The position of the sub-display 21 is not limited to the back side of the display unit 12. The sub-display 21 may be provided at an arbitrary position on the body of the computer 10 so long as it is exposed outside in a sate that the display unit 12 is closed.

Figure 3:
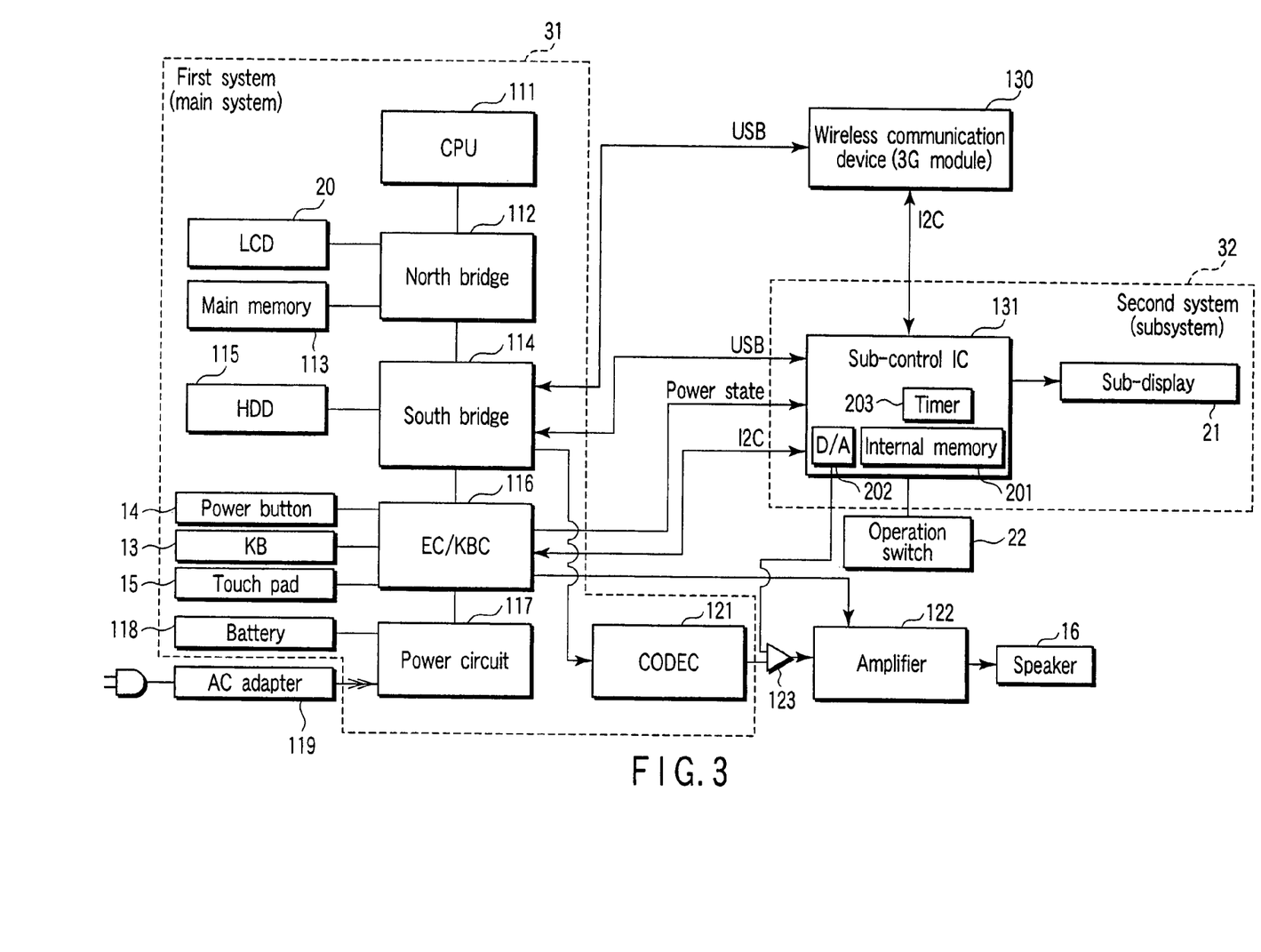
FIG. 3 is an exemplary block diagram showing the configuration of the information processing apparatus of FIG. 1.

FIG. 3 is a block diagram showing the system configuration of the computer 10.

The computer 10 includes two, that is, first and second systems, and wireless communication device 130.

The first system is a main system 31, which is configured to be operated under the control of the operating system. The first system is built in the base unit 11. The main system 31 operates when the body of the computer 10 is powered on. The main system 31 includes CPU 111, north bridge 112, main memory 113, south bridge 114, hard disk drive (HDD) 115, embedded controller/keyboard controller (EC/KBC) IC 116 and power circuit 117.

The CPU 111 is a main processor, which controls the operation of the computer 10. The CPU 111 executes an operating system and various application programs/utility programs, which are loaded to the main memory 113 from the HDD 115.

The operating system is a so-called basic program. For example, typically, Windows (registered trademark) XP of Microsoft Corporation or Mac OS (registered trademark) of Apple Computer, Inc., is given. Namely, the operating system is a program controlling a basic operation of the computer. The function provided by the operating system includes a system volume setup function of setting a system volume of the system. The system volume is managed according to 256-grade level, and the settings are stored in the main memory 113 as the third storage.

Moreover, mail software (mailer) for sending and receiving an e-mail is given as the application program. The CPU 111 executes the mailer, and thereby, sends the e-mal to an outside device such as mail server and received it from there. The mailer manages a predetermined storage area on the HDD 115 as an inbox (received mail tray) area, and then, stores the received e-mal group in the inbox area.

The north bridge 112 is a bridge device making a connection between a local bus of the CPU 111 and the south bridge 114. Moreover, the north bridge 112 has a built-in display controller controlling the LCD 20 functioning as the main display of the computer 10. The north bridge 112 further has a built-in memory controller controlling the main memory 113.

The south bridge 114 functions as an I/O controller for controlling various I/O devices. The south bridge 114 also has built-in Integrated Drive Electronics (IDE) controller controlling the HDD 115 and Universal Serial Bus (USB) host controller controlling USB. The south bridge 114 is connected to the wireless communication device 130 via a serial bus such as USB. Moreover, the south bridge 114 is connected to a coder-decoder (CODEC) 121 for coding/decoding audio data via an HD Audio LINK.

The south bridge 114 supplies digital sound data to the CODEC 121 via the HD Audio LINK. In this case, the digital sound data is encoded according to Audio Code 3 (AC3) and Advanced Audio Coding (AAC) stored in the hard disk drive 115 used as storage or the main memory 113.

The CODEC 121 decodes the sound data, and thereafter, converts the decoded sound data into an analog sound signal (digital-to-analog conversion). Specifically, the CODEC 121 converts the sound data into an analog sound signal having volume based on a system volume signal stored in the main memory as the second storage. The audio CODEC 121 supplies the digital-to-analog-converted sound signal to an amplifier 122 independent from the main system 31 via a synthesizer 123. The amplifier 122 amplifies the input sound signal with a predetermined amplification factor, and then, supplied to the speaker 16. Thereafter, the sound is output from the speaker.

The south bridge is further connected to the subsystem 32 functioning as the foregoing second system via a serial bus such as USB.

The embedded controller/keyboard controller (EC/KBC) IC 116 is a one-chip microcomputer integrating the following controllers. One is an embedded controller for power management, and another is a keyboard controller for controlling the keyboard (KB) 13 and touch pad 15. The embedded controller/keyboard controller IC 116 controls power on/off of the computer 10 in accordance with the operation of the power button 14 by user in cooperation with the power circuit 117. The power circuit 117 generates an operating power to be supplied to various components of the computer 10 using external power supplied via battery 118 or AC adapter 119. Even if the computer 10 is in a power-off state, the EC/KBC 116 is supplied with the operating power from the power circuit 117.

The subsystem 32 functioning as the second system executes the foregoing notification and alarm functions. The subsystem 32 is configured to operate independently from the main system 31. Even if the computer 10, that is, the main system is in a power-off state, the subsystem 32 is supplied with the operating power from the power circuit 117. The subsystem 32 is a dedicated system for performing the notification function. The power consumption of the subsystem 32 is considerably smaller than that of the main system 31.

The subsystem 32 includes sub-control IC 131 and the foregoing sub-display 21. The sub-control IC 131 is a processor for controlling the operation of the subsystem 32. For example, the sub-control IC 131 comprises a memory embedded one-chip microcomputer.

The sub-control IC 131 includes internal memory 201, digital-to-analog converter 202 and timer 203. The internal memory 201 as a semiconductor memory built in the sub-control IC is a non-volatile semiconductor memory, that is, flash memory. The internal memory 201 is stored with firmware, program, sound data used as second sound data, font and icon data. The sub-control IC 131 executes firmware and program stored in the internal memory 201. Moreover, the sub-control IC 131 includes a digital-to-analog converter 202. The digital-to-analog converter 202 converts sound data used as second sound data stored in the internal memory 201 as the semiconductor memory into an analog sound signal (digital-to-analog conversion). The sound signal converted by the digital-to-analog converter 202 is supplied to the amplifier 122 independent from the subsystem 32 via the synthesizer 123.

Moreover, the sub-control IC 131 may have a built-in DRAM used for work independently from the flash memory. The sub-control IC 131 loads firmware and program stored in the internal memory 201 to the DRAM used for work, and then, executes them. The internal memory 201 may be a DRAM, and not flash memory.

The program stored in the internal memory includes electronic mail software (mailer) and scheduler. The mailer receives an electronic mail (e-mail) from the external device such as mail server. The scheduler realizes the alarm function using the timer 203. The mailer comprises the minimum functional module required for receiving the e-mail. The sub-control IC 131 is connected to the south bridge included in the main system 31 via a serial bus such as USB. The sub-control IC 131 is further connected to the EC/KBC 116 included in the main system 31 via a serial bus such as I²C. The sub-control IC 131 is further connected to the wireless communication device 130 via the serial bus such as I2C.

The sub-control IC 131 executes the mailer stored in the internal memory 201 to make communications for receiving data such as e-mail from the external device. The communications are made even if the computer 10, that is, the main system 31 is in a power-off state. The received data such as e-mail is stored in the internal memory 201. Moreover, the sub-control IC 131 has a function of controlling the sub-display 21.

The wireless communication device 130 makes wireless communications with a base station according to the wireless communication standard such as 3G wireless WAN. The 3G wireless WAN is a wide-area wireless network such as mobile phone network. Even if the computer 10, that is, the main system 31 is in a power-off state, the wireless communication device 130 is supplied with an operating power from the power circuit 117.

In the computer 10, the main system 31 and the subsystem 32 are each connected electrically to the wireless communication device 130. Namely, the foregoing main system 32 and subsystem 32 share the wireless communication device 130. When the main body of the computer 10 is powered on, the wireless communication device 130 is used by the main system 31 connected via a USB bus.

On the other hand, when the main body of the computer 10, that is, the main system 31 is powered off, the wireless communication device 130 is used by the subsystem 32 connected via the I²C bus.

When the main body of the computer 10 is in a power-on state, the main system 31 executes mail software operating on the operating system. The main system 31 makes wireless communications with the external device using the wireless communication device 130 under the control operating system and mail software. By doing so, the main system 31 receives data such as e-mail to the computer 10 from the external device, and stores the received data in the HDD 115.

On the other hand, when the main body of the computer 10 is in a power-off state, the subsystem 32 makes wireless communications with the external device using the wireless communication device 130 under the control of the mail software stored in the internal memory 201. By doing so, the subsystem 32 receives header information of the e-mail to the computer 10 from the external device, and stores the received header information in the internal memory 201.

When receiving data such as e-mail, the subsystem 32 outputs sound from the speaker 16 using the sound data stored in the internal memory 201. Moreover, the subsystem 32 displays the foregoing notification information that data such as e-mail is received on the sub-display 21.

The sound data stored in the internal memory 201 is non-compression format sound data converted according to pulse code modulation (PCM). For example, the sound data is data formatted according to a WAV format.

As described above, the wireless communication device 130 is connected to both of the main system 31 and the subsystem 32 in the computer 10. Therefore, even if the computer is in either of power-on and power-off states, communications with the external device is made using the wireless communication device 130. When a new e-mail is received, sound rings to notify the arrival of the new e-mail to user.

Figure 4:
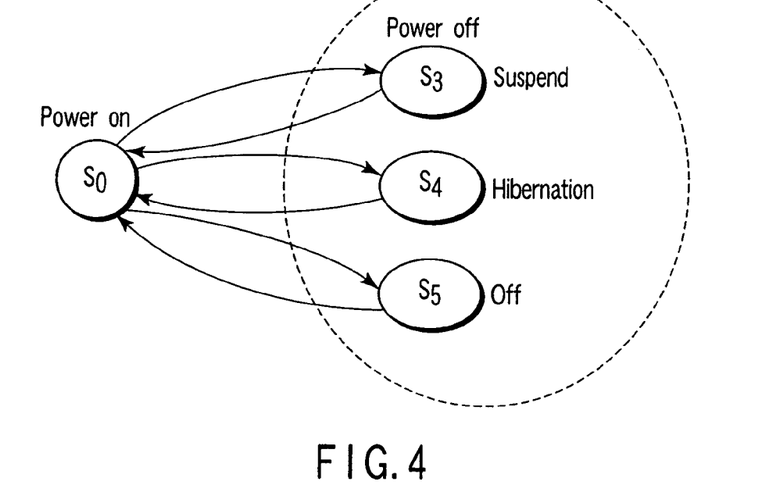
FIG. 4 is an exemplary view to explain the system state transition of the information processing apparatus shown in FIG. 1.

FIG. 4 is a view to explain the system state transition of the computer 10. The computer 10 supports four system states S0, S3, S4 and S5. The system state S0 is an operating state that the computer 10 is powered on. In the system state S0, the main system 31 is operating under the control of the operating system. System states S3 (suspend), S4 (hibernation) and S5 (off) are each low power consumption state that the computer is powered off. In system state S3, S4 or S5, the main system 31 does not operate.

In either of system state S3, S4 and S5, EC/KBC 116, subsystem 32 and wireless communication device 130 are each supplied with an operating power.

The notification function is usable even if the computer 10 is set to either of S3, S4 and S5. Specifically, even if the computer 10 is in a power-off state (S3, S4 or S5), the subsystem 32 is independently operating to execute the notification function. Therefore, data such as e-mail is receivable without booting the operating system operating on the main system 31. Incidentally, data to be received by the notification function is not limited to the e-mail. For example, according to the notification function, home page is received from a specified Web server.

However, in system states S3, S4 and S5, the amplifier 122 is usually powered off. The amplifier 122 is selectively powered on only when sound is given. When the state is changed into a power-off state, the EC/KBC 116 turns off the amplifier 122. The sub-control IC 131 gives instructions to turn on the amplifier 122 to the EC/KBC 116 only when ringing sound. The EC/KBC 116 supplies an operation power to turn on the amplifier in response to the instructions from the sub-control IC 131. The sound signal is supplied to the amplifier to ring sound, and thereafter, the sub-control IC 131 gives instructions to turn off the amplifier 122 to the EC/KBC 116. Then, the EC/KBC 116 turns off the amplifier 122.

Figure 5:
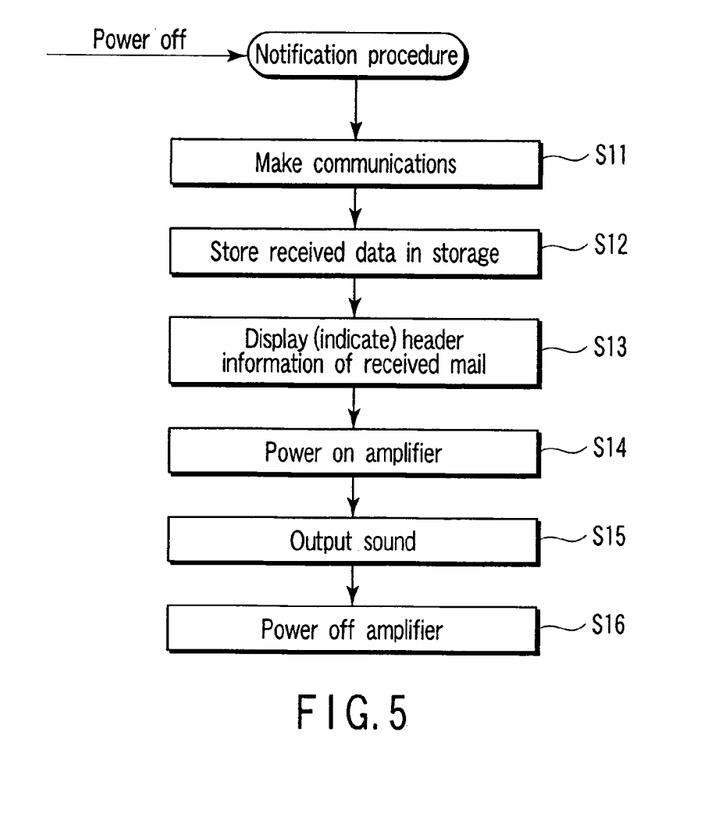
FIG. 5 is an exemplary flowchart to explain a basic notification procedure taken by the information processing apparatus of FIG. 1.

The basic procedure of notification will be explained below with reference to a flowchart of FIG. 5.

When the computer 10, that is, the main system 31 is powered off, the sub-control IC 131 starts the operation. Here, the power-off state means the foregoing system state S3, S4 or S5. The sub-control IC 131 has the following function.

Namely, the sub-control IC 131 monitors a power state signal from the EC/KBC 116. Then, the sub-control IC 131 determines whether or not the computer 10, that is, the main system 31 is powered off (S3, S4 or S5) in accordance with a voltage value of the power state signal.

The sub-control IC 131 makes communications with the external device using the wireless communication device 130 to make communication receiving data such as e-mail from the external device (block S11). The communications are made via the wireless communication device 130. For example, the communications are made when the wireless communication device 130 receives a signal from the external device showing information that a new e-mail to the computer 10 exists. Specifically, when receiving an e-mail to the computer 10, the external device notifies the information to the wireless communication device 130 via a wireless signal. When the wireless communication device 130 receives the signal, the sub-control IC 131 starts the foregoing communications to receive the e-mail to the computer 10 from the external device. In this case, the sub-control IC 131 may be configured to take the following procedure. Namely, the sub-control IC 131 does not make communications in response to the notification from the external device, but periodically makes communications for confirming whether or not the external device receives the e-mail to the computer 10.

After the procedure of block S11 is taken, the sub-control IC 131 stores the received data such as e-mail in the internal memory 201 (block S12).

Then, the sub-control IC 131 displays the header of the received e-mail on the sub-display 21 (block S13).

The sub-control IC 131 gives instructions to turn on the amplifier 122 to the EC/KBC 116. Then, the EC/KBC 116 turns on the amplifier 122 (block S14). The sub-control IC 131 is notified that the amplifier is turned on.

The sub-control IC 131 converts sound data as second sound data stored in the internal memory 201 into an analog sound signal using the digital-to-analog converter. The generated sound signal is supplied to the amplifier 122 via a synthesizer 123. Then, the amplifier 122 amplifies the input sound signal to supply it to the speaker 16, and thereby, sound is output from the speaker 16 in accordance with the sound signal (block S15).

The sub-control IC 131 gives instructions to turn off the amplifier 122 to the EC/KBC 116. Then, the EC/KBC 116 turns off the amplifier 122. The EC/KBC 116 gives notification of turning off the amplifier 122 to the sub-control IC 131 (block S16).

When the computer 10 is in a power-off state, the sub-control IC 131 takes blocks S11 to S15 every when the wireless communication device 130 receives the foregoing notification from the external device.

As described above, even if the subsystem 32 only is operating without operating the main system 31, sound is output from the speaker 16. Sound data used as sound source output when the subsystem 32 is operating is stored in the internal memory 201. The internal memory is a semiconductor memory having access latency shorter than the hard disk drive. Thus, the sound data stored in the internal memory 201 is rapidly transferred to the digital-to-analog converter 202 to output the sound from the speaker 16. Moreover, if the internal memory 201 is provided as a non-volatile semiconductor memory, the following advantage is given. Specifically, no refresh operation is required to hold data, and there is no power consumption in standby, and further, power to hold data is not necessary. Therefore, power consumption is reduced when the subsystem 32 is operating.

The amplifier 122 is selectively turned on only when there is a need of ringing sound. By doing so, power consumption when no sound is output is reduced. This serves to elongate the operating time of the computer.

Preferably, the number of gates is reduced to make small power consumption in the sub-control IC 131. The sub-control IC 131 is hard to have a codec function. In this apparatus, the subsystem 32 is provided with the digital-to-analog converter 202, which executes digital-to-analog conversion given by the slight number of gates. Sound data reproduced by the subsystem 32 is limited to non-compression format data. As a result, power consumption in operating the subsystem 32 is reduced.

The sound signal from the CODEC 121 and the sound signal from the digital-to-analog converter 202 are added by the synthesizer 123, and thereafter, supplied to the amplifier 122. This serves to give the following advantage. Specifically, if two sound signals are added using an adder, the sound signal supplied to the amplifier 122 must be changed over between two cases. Namely, one is the case where the main system 31 is operating, and another is the case where the subsystem 32 is operating. Therefore, there is no need of providing a changer for changing over the sound signal, so that the apparatus is simplified.

The amplifier 122 merely amplifies the input sound signal with a predetermined amplification factor, and does not have a function of controlling the amplification factor. Thus, the sound signal input to the amplifier 122 must be controlled to adjust volume. If the computer is in a power-on state, the CODEC 121 processes sound data to process the sound signal input to the amplifier. However, the sub-control IC 131 has no function of processing the sound data to adjust volume.

In order to ring sound having different volume when the notification function performs, the internal memory 201 is stored with three sound data, for example. These three sound data have the same sound output from the speaker 16, but have different volume. Small volume, medium volume and large volume sound data are stored as the foregoing three sound data.

Mail software operating on the second system selects sound data in accordance with volume information stored in the internal memory 201 used as a second semiconductor memory. In this manner sound is output from the speaker 16. Incidentally, the volume information may be stored in a DRAM used for work as the second semiconductor memory provided independently from the flash memory.

Figure 6:
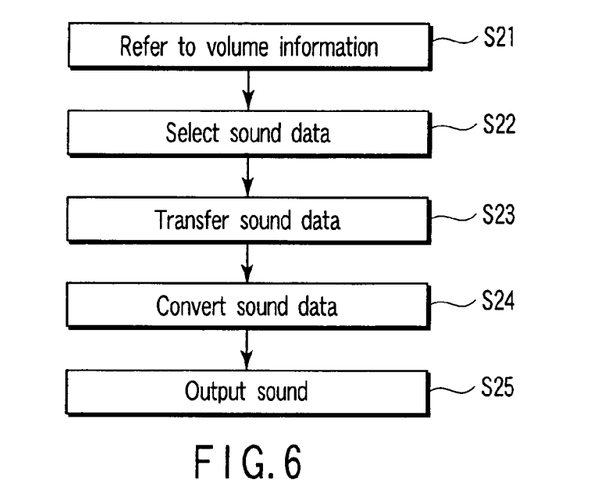
FIG. 6 is an exemplary flowchart to explain a sound output procedure taken by the information processing apparatus of FIG. 1.

The procedure of referring to volume information to output sound in a power-off state will be explained below with reference to FIG. 6.

First, the mailer refers to volume information (block S21). Then, the mailer selects sound data having volume corresponding to the volume information (block S22). Thereafter, the mailer transfers the selected sound data to the digital-to-analog converter 202 (block S23). In order to readily select a file of the sound data corresponding to the volume information, a file name is changed in accordance with volume. For example, a file name of the small volume sound data is set as "xxxx_s.wav". A file name of the medium volume sound data is set as "xxxx_m.wav". A file name of the large volume sound data is set as "xxxx_l.wav". In accordance with the volume, a word "xxxx" before "_" has no change. In accordance with the volume, a word after "_" is changed into "s", "m" and "l". The mailer refers to the word after "_", that is, "s", "m" and "l", and thereby, selects data corresponding to the volume information.

The digital-to-analog converter 202 converts the supplied data into analog data to generate an analog sound signal (block S24). The digital-to-analog converter 202 supplies the sound signal to the speaker 16, and thus, sound corresponding to the sound signal is output from the speaker (block S25).

The foregoing procedures are taken, and thereby, the subsystem 32 selects sound data corresponding to the volume information, and outputs sound from the speaker 16.

In this case, user may set up the volume information, or the main system 31 may automatically set up it. If the main system 31 sets up the volume information, the CPU 111 executes the setup according to utility program loaded to the main memory 113 when changing from a power-on state to a power-off state.

The volume information setup is executed according system volume settings stored in the main memory 113 as a fourth storage.

Figure 7:
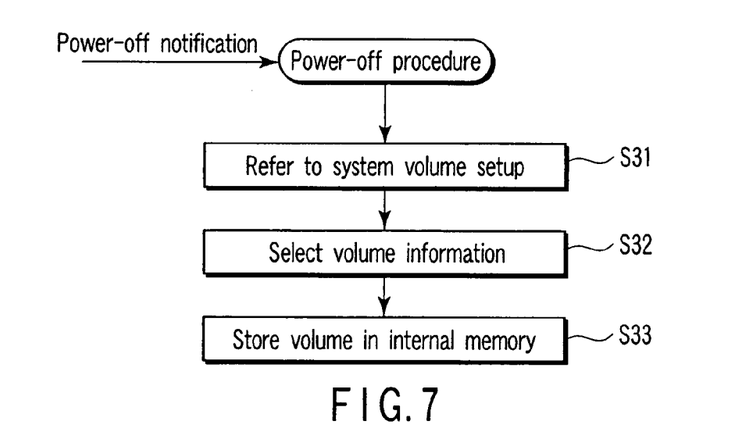
FIG. 7 is an exemplary flowchart to explain a procedure of storing volume information in an internal memory, taken by the information processing apparatus of FIG. 1.

The procedure of storing volume information in the internal memory 201 of the subsystem 32 by the main system 31 when the state changes from a power-on state to a power-off state will be explained below with reference to FIG. 7.

The CPU is notified that the computer 10 changes from a power-on state (S0) to a power-off state (S3, S4 or S5). Then, the CPU 111 refers to system volume settings stored in the main memory as a fourth storage (block S31).

Figure 8:
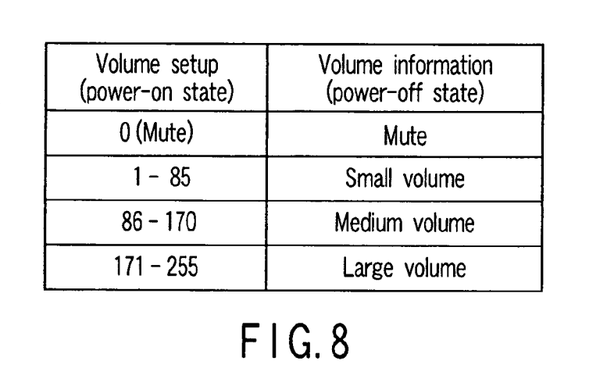
FIG. 8 is an exemplary table to explain the rule of selecting volume information from system volume setup.

The CPU 111 selects volume information based on the system volume settings and the rule shown in FIG. 8 (block S32). Then, the CPU stores the selected volume information in the internal memory as the second semiconductor memory (block S33). Moreover, the volume information may be stored in a DRAM for work used the second semiconductor memory provided independently from a flash memory.

The foregoing procedures are taken, and thereby, the volume information when the subsystem 32 is operating is automatically set in accordance with the system volume settings.

According to the foregoing embodiment, the mailer of the subsystem 32 outputs sound. The same procedures are taken when the scheduler realizing the alarm function outputs sound at setup time.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
a body;
an amplifier provided in the body, and amplifying a sound signal to output sound from a speaker;
a first system provided in the body, the first system including a storage storing a first sound data and a sound device which generates an analog sound signal from the first sound data and supplies the generated sound signal to the amplifier, and configured to operate under the control of an operating system, and further, outputting sound using the first sound data when the body is in a power-on state; and
a second system provided in the body, the second system configured to operate independently from the first system, and including a semiconductor memory storing a non-compression format second sound data and a digital-to-analog converter, which converts the second sound data into an analog sound signal and supplies the converted analog sound signal into the amplifier, and further, outputting sound using the second sound data when the body is in a power-off state,
wherein the amplifier has a function of amplifying an input sound signal with a predetermined amplification factor, and supplying the amplified sound signal to the speaker,
wherein the semiconductor memory stores one or more digital sound data having the same sound output from the speaker as the second sound data but different volumes than the second sound data; and
wherein the second system further comprises:
a second semiconductor memory that stores volume information;
a selecting section which selects one of the one or more digital sound data having different volumes in accordance with the volume information; and
a transferring section which transfers the selected sound data to the digital-to-analog converter.

2. The apparatus according to claim 1, wherein the semiconductor memory is a non-volatile semiconductor memory.

3. The apparatus according to claim 1, further comprising:
a power controller which turns on the amplifier in outputting sound from the speaker when the body is in a power-off state.

4. The apparatus according to claim 1, wherein the first system further includes:
a second storage storing volume settings output from the speaker; and
a storing section which stores the volume information corresponding to the volume settings in the second semiconductor memory when the body changes from a power-on state to a power-off state.

5. The apparatus according to claim 1, further comprising:
a synthesizer which synthesizes a sound signal generated by the sound device and a sound signal converted by the digital-to-analog converter, and which supplies the synthesized sound signal to the amplifier.

6. A sound output method used for an information processing apparatus including an amplifier amplifying a sound signal and outputting sound from a speaker, comprising:
inputting a sound signal generated from a first sound data using a sound device to the amplifier by a first system configured to operate under the control of an operating system when the information processing apparatus is in a power-on state, thereby outputting sound corresponding to the first sound signal from the speaker; and
inputting a second sound data generated by converting a non-compression format second sound data stored in a semiconductor memory into an analog sound signal using a digital-to-analog converter to the amplifier when the information processing apparatus is in a power-off state, thereby outputting sound corresponding to the second sound signal from the speaker,
wherein the amplifier has a function of amplifying an input sound signal with a predetermined amplification factor, and supplying the amplified sound signal to the speaker;
wherein the semiconductor memory stores one or more digital sound data having the same sound output from the speaker as the second sound data but different volumes than the second sound data;
the method further comprising:
referring to volume information stored in a second semiconductor memory;
selecting one of the one or more digital sound data having different volumes in accordance with the referenced volume information; and transferring the selected sound data to the digital-to-analog converter.

7. The method according to claim 6, wherein the semiconductor memory is a non-volatile semiconductor memory.

8. The method according to claim 6, further comprising:

selectively turning on the amplifier in outputting sound from the speaker before inputting the analog sound signal to the amplifier.

9. The method according to claim 6, wherein the first system further includes a second storage storing volume settings output from the speaker, the method further comprising:

referring to volume information corresponding to the volume settings; and storing the volume information corresponding to the referenced volume settings in the second semiconductor memory.

* * * * *